United States Patent [19]

Eckardt et al.

[11] Patent Number: 5,466,141
[45] Date of Patent: Nov. 14, 1995

[54] DEVICE FOR INJECTION MOLDING ARTICLES OF PLASTICS MATERIAL WHICH CONTAIN HOLLOW SPACES

[75] Inventors: Helmut Eckardt, Meinerzhagen; Jürgen Ehritt, Hilchenbach; Michael Renger, Meinerzhagen, all of Germany

[73] Assignee: Battenfeld GmbH, Meinerzhagen, Germany

[21] Appl. No.: 258,914

[22] Filed: Jun. 13, 1994

Related U.S. Application Data

[63] Continuation of Ser. No. 911,268, Jul. 7, 1992, which is a continuation of Ser. No. 607,233, Oct. 31, 1990, abandoned.

[30] Foreign Application Priority Data

Nov. 1, 1989 [DE] Germany ............ 39 36 289.2

[51] Int. Cl.⁶ .................................................. B29C 45/20
[52] U.S. Cl. .................... 425/130; 264/572; 425/536; 425/564; 425/566
[58] Field of Search .................. 425/130, 535, 425/536, 562, 563, 564, 565, 566; 264/572, 573, 574

[56] References Cited

U.S. PATENT DOCUMENTS

| | | | |
|---|---|---|---|
| 3,937,610 | 2/1976 | Farrell | 425/535 |
| 4,101,617 | 7/1978 | Friedrich | 425/533 |
| 4,150,689 | 4/1979 | Britten | 425/535 |
| 4,285,661 | 8/1981 | Yotsutsuji et al. | 425/563 |
| 4,368,847 | 1/1983 | Ersfeld | 425/566 |
| 4,740,150 | 4/1988 | Sayer | 425/542 |
| 4,917,594 | 4/1990 | Gellert et al. | 425/564 |
| 4,990,083 | 2/1991 | Bernhardt | 425/562 |

FOREIGN PATENT DOCUMENTS

| | | | |
|---|---|---|---|
| 2106546 | 8/1972 | Germany . | |
| 2461580 | 7/1975 | Germany . | |
| 2501314 | 7/1976 | Germany . | |
| 1023900 | 3/1966 | United Kingdom | 425/564 |

*Primary Examiner*—Tim Heitbrink
*Attorney, Agent, or Firm*—Anderson Kill Olick & Oshinsky

[57] ABSTRACT

A device for injection molding articles of plastics material having hollow spaces. The device includes a molding tool with a mold cavity. Plastics material melt is fed to the mold cavity through a nozzle. Another pressurized medium is supplied to the mold cavity through a hollow needle at a location different from the location of the nozzle. A needle core is mounted in the hollow needle. The needle core is axially displaceable within certain limits. The opening of the hollow needle to the mold cavity can be opened and closed or its cross-sectional area can be varied by moving the needle core.

6 Claims, 2 Drawing Sheets

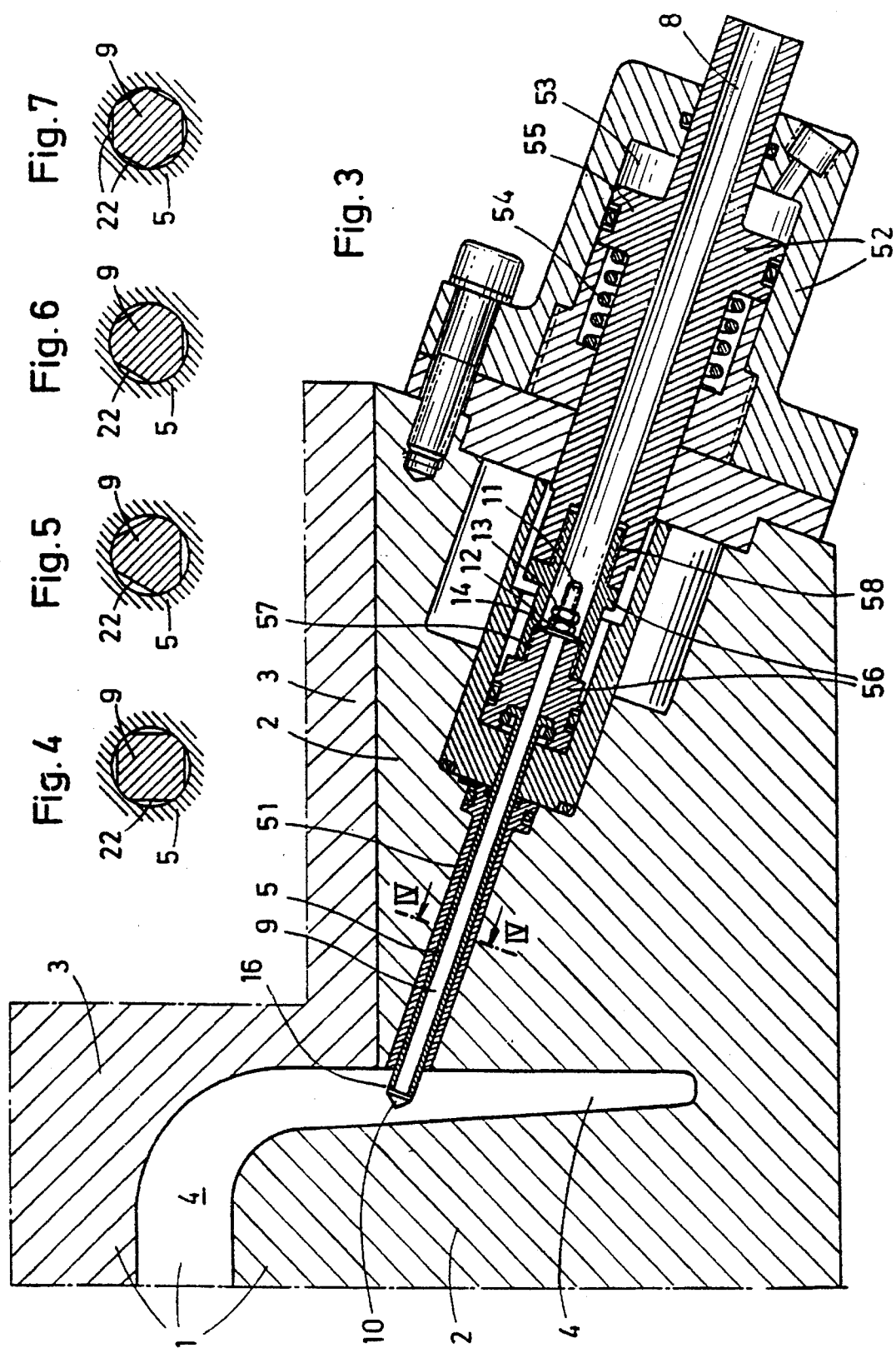

DEVICE FOR INJECTION MOLDING ARTICLES OF PLASTICS MATERIAL WHICH CONTAIN HOLLOW SPACES

This is a continuation of application Ser. No. 07/911,268 filed Jul. 7, 1992, which itself is a continuation of Ser. No. 07/607,233 filed Oct. 31, 1990, now abandoned.

BACKGROUND OF THE INVENTION

1. Field of the Invention

The present invention relates to a device for injection molding articles of plastics material having hollow spaces. The device includes a molding tool with a mold cavity. Plastics material melt is supplied to the mold cavity through a nozzle. Another pressurized medium, such as air, gas or liquid, can be supplied to the mold cavity through a hollow needle at a location different from the location of the nozzle.

2. Description of the Related Art

It is already known in the art from German Offenlegungsschrift 21 06 546 to manufacture articles having hollow spaces of plastics material in the mold cavity of a molding tool by supplying, after the injection of the plastics material melt within the injection period provided for this purpose, to the low-viscosity center of the injection molded body within the subsequent afterpressure period compressed gas, preferably compressed air, and then to fill the hollow space in the injection molded body during the afterpressure period with a foamed plastics material. For this purpose, an injection mold with injection nozzles is used which has another nozzle for supplying the afterpressure gas, which can be connected to an appropriate gas source and whose opening projects into the region of the low-viscosity center of the injection molded body.

In this manner, it is possible to produce articles of plastics material, even with large volumes, without problems. Without requiring a complicated construction of the molding tools and without having to operate with exactly measured injection periods, afterpressure periods and exact pressures and temperatures.

On the other hand, it is also already known from German Auslegeschrift 24 61 580, from German Offenlegungsschrift 25 01 314, and from U.S. Pat. Nos. 4,101,617 and 4,740,150 to inject the plasticized plastics material, on the one hand, and the additional pressurized medium, on the other, practically at the same location into the mold cavity of the molding tool.

Particularly in injection molding devices of the type mentioned last, it has been found disadvantageous that the nozzles serving for supplying the additional pressurized medium, such as air, gas or liquid, are too frequently clogged with the plastics material to be processed and, therefore, have to be cleaned after almost every successive injection procedure to ensure that they satisfactorily carry out their functions.

The device, according to German Offenlegungsschrift 21 06 546, has a nozzle which is formed as a hollow needle extending significantly into the mold cavity. However, this hollow needle is also clogged in an undesirable manner, at least when the amount of the plastics material melt introduced into the mold cavity is dimensioned such that it reaches within the low-viscosity center of the injection molded body up to the opening of the hollow needle, or even covers or flows over the opening when the gas pressure is reduced in the hollow space as the afterpressure period ends. This is because any melt still in liquid form can penetrate into the relatively large cross-sectional area of the opening of the hollow needle and clog the opening.

If this disadvantage is to be prevented in the device according to German Offenlegungsschrift 21 06 546, the hollow needle must always extend into the center of the mold cavity by such an extent that any liquid plastics material melt cannot reach the nozzle opening even after the afterpressure period has ended, rather, it must be ensured that no melt can reach the nozzle opening.

However, it has been found advantageous if the nozzles or hollow needles serving for supplying the additional pressurized medium do not extend through the wall thickness of the articles to be manufactured in the cavity of the molding tool up to the region of the hollow space to be formed; rather, the nozzles or hollow needles should only project into a portion of the wall thickness being created. This facilitates an automatic sealing of the opening of the nozzle or hollow needle at the end of each injection procedure from the inside by means of plastics material melt still in liquid form, as is desirable or even required in most cases.

SUMMARY OF THE INVENTION

It is, therefore, the primary object of the present invention to provide a device for injection molding articles of plastics material having hollow spaces of the abovedescribed type, in which clogging of the opening of the hollow needle is safely prevented even if the opening extends at the end of the injection procedure and the subsequent afterpressure period only into a portion of the wall thickness of the article; i.e., the opening is still surrounded by liquid plastics material melt.

In accordance with the present invention, a needle core is mounted in the hollow needle, wherein the needle core is axially displaceable within certain limits. The opening of the hollow needle to the mold cavity can be varied in its cross-sectional area or can be opened and closed by means of the needle core.

The features provided according to the present invention make it possible to adjust the opening of the hollow needle to such a small size that it permits the pressurized medium to be discharged into the mold cavity, while it prevents a penetration of the liquid plastics material melt into the opening.

In accordance with a particularly advantageous feature of the invention, when the needle core is maintained at a certain axial position within the hollow needle, the needle core forms with the end of the hollow needle a radially directed gap-type valve with a gap width of less than 0.2 mm, preferably less than 0.1 mm.

In accordance with another feature, the needle core may have an increased-diameter head or plate located in front of the opening of the hollow needle, wherein the outer diameter of the head or plate corresponds at least approximately to the outer diameter of the hollow needle. Advantageously, the free end of the head or plate may be provided with a rounded portion or peak-like portion.

In accordance with an advantageous further development of the invention, the hollow needle has a length portion extending from the opening of the hollow needle. Along this length portion, the hollow needle has an inner diameter which corresponds to the outer diameter of the needle core, so that the hollow needle and needle core have sliding contact. The hollow needle has another length portion located remotely from the opening of the hollow needle. This other length portion has an inner diameter which continuously maintains a radial gap between the hollow needle and the outer diameter of the needle core. The needle core has a length portion which extends from its free end, for example, the head or plate, to the length portion of the hollow needle which provides a gap between the hollow needle and the needle core. The needle core has over, the described length portion, at least one longitudinal groove or a diametrical slot.

In accordance with a modification of the embodiment described above, the hollow needle has a length portion extending from the opening of the hollow needle. Along this length portion, the hollow needle has an inner diameter which corresponds to the outer diameter of the needle core, so that the hollow needle and needle core have sliding contact. The hollow needle has another length portion located remote, from the opening of the hollow needle. This other length portion has an inner diameter which continuously maintains a radial gap between the hollow needle and the outer diameter of the needle core. The needle core has a length portion which extends from its free end—for example, the head or plate, to the length portion of the hollow needle which provides a gap between the hollow needle and the needle core. The needle core has over, the described length portion, at least one, preferably several, circumferential flattened portions.

Finally, in accordance with another feature, the needle core may have a central gas duct which is in communication at a distance from its free end with at least one radial outlet opening which is axially displaceable relative to the opening of the hollow needle. In this case, the free end of the needle core may have a peak-like or rounded portion in front of and spaced from the radial bore.

When the hollow needle extends in the direction of the opening of the molding tool, i.e., when the hollow needle assumes an essentially normal position relative to the plane of separation of the molding tool, it is possible, in a particularly simple manner, to mount the hollow needle projecting stationary into the mold cavity. However, when the direction of opening of the molding tool deviates from the direction of extension of the hollow needle, it is important, in accordance with the present invention, that the hollow needle is mounted so as to be temporarily advanced into the mold cavity. The hollow needle may be displaceable by means of an adjustment drive. This adjustment drive may be a drive operated with a compressed medium, for example, a pneumatic drive or a hydraulic drive.

If the drive is a double-acting drive, it can serve to carry out the feeding movement and the retraction movement of the hollow needle.

However, the drive may also be a simple-acting feed drive, while a retraction drive may be a spring which must be overcome by the feed drive.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWINGS

FIG. 3 is a partial sectional view of a device for injection molding articles of plastics material having hollow spaces, in which the arrangement and configuration of the hollow needle arranged axially slidably relative to the mold cavity of the molding tool, is modified as compared to FIG. 2; and FIGS. 4 to 7 are sectional views on a larger scale, taken along sectional IV—IV in FIGS. 1 and 3 through the duct of the hollow needle and the needle core received in the ducts.

DETAILED DESCRIPTION OF THE PREFERRED EMBODIMENTS

Figure 1:
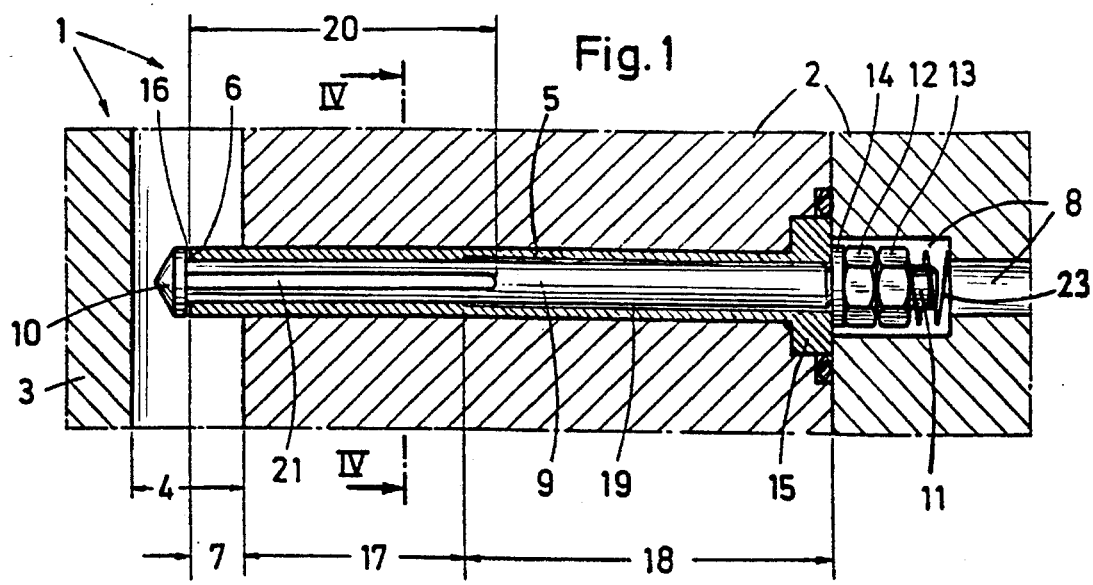
FIG. 1 is a partial, longitudinal sectional view of a device for injection molding articles of plastics material having hollow spaces, wherein a stationary hollow needle for supplying an additional pressurized medium projects into the cavity of a molding tool.

FIG. 1 of the drawing shows a molding tool 1 for injection molding articles of plastics material which have hollow spaces. The molding tool 1 includes two mold halves, 2 and 3, which together form the mold cavity 4.

Plasticized plastics material melt is fed into the mold cavity 4 of the molding tool 1 through a nozzle, not shown.

At a location which differs from the location of the above-mentioned nozzle, another pressurized medium, for example, air, gas or liquid, may be fed into the mold cavity 4 through a hollow needle 5. The hollow needle 5 is mounted stationary in the mold half 2 of the molding tool 1, so that it projects with its open end 6 by a significant dimension 7 into the mold cavity 4.

The additional pressurized medium can be supplied to the hollow needle 5 through a connecting duct 8 in the mold half 2. An axially adjustable needle core 9 is arranged in the hollow needle 5. The needle core 9 has an increased-diameter head or plate 10 located in front of the open end 6 of the hollow needle 5. The outer diameter of the head or plate 10 corresponds at least approximately to the outer diameter of the hollow needle 5. At an end facing away from the head or plate, the needle core has a threaded portion 11 on which are mounted an adjusting nut 12 and a counter nut 13 which interact with a support collar or support disk 14 which is pressed by means of a compression spring 23 against an increased-diameter end portion 15 of the hollow needle.

The needle core 9 can be axially adjusted within the hollow needle 5 by means of the adjusting nut 12, the counter nut 13 and the support collar or support disk 14, such that an opening in the form of a radially directed gap-type valve 16 is created between the head or plate 10 of the needle core 9 and the end 6 of the hollow needle 5. The opening gap of the valve 16 is directed into the mold cavity 4 and the cross-sectional size of the valve can be varied.

The device is advantageously constructed in such a way that the gap 16 can be adjusted by means of the adjusting nut 12, the counter nut 13 and the support collar or support disk 14 to a width of less than 0.2 mm, preferably less than 0.1 mm. A minimum cross-sectional size can be ensured by providing radially extending or obliquely outwardly extending grooves, not shown, in the bottom side of the increased-diameter head or plate 10.

Over a length portion 17 adjacent to the opening end 6, the hollow needle 5 has an inner diameter which contacts the outer diameter of the needle core 9 with sliding fit. Along the length portion 18 remote from the end 6, the hollow needle 5 has an inner diameter which maintains a radial gap distance 19 from the outer diameter of the needle core 9. A flow connection from the connecting duct 8 to the gap 19 is ensured by means of openings, not shown, in the support disk 14 and/or the increased diameter portion 15.

The needle core 9 has a length portion 20 which extends from its free end, for example, the head or plate 10, to the gap portion 19 of the hollow needle 5. Along the length portion 20 the needle core 9 has at least one longitudinal groove or a diametrical slot 21. Thus, the pressurized medium can flow from the connecting duct 8 through the gap 19 and through the longitudinal groove or diametric slot 21 to the radial gap valve 16, where it enters the mold cavity 4 of the molding tool 1 through a very small opening gap.

Since, as already mentioned, the gap valve 16 can be adjusted to a gap width of less than 0.2 mm, the pressurized medium can reach the mold cavity 4, while it can prevent plastic material melt from accumulating at or clogging the gap valve 16.

Contrary to the embodiment illustrated in FIG. 1 of the drawing, it is also possible to provide a needle core 9 within the hollow needle 5 which has a cross-sectional shape along the length portion 20, as it is illustrated in FIG. 4–7 of the drawing. Thus, instead of the longitudinal groove or the diametric slot 21, the needle core can be provided over the length portion 20 with at least one, preferably several, circumferential flattened portions 22, as they are shown in FIGS. 4–7. As illustrated in FIG. 4, four circumferential flattened portions 22 are provided on the needle core 9 uniformly distributed in circumferential direction. In FIGS. 5 and 6, the needle core has three flattened portions 22, while in FIG. 7 the needle core has eight flattened portions 22 which are uniformly distributed over the circumference.

Figure 2:
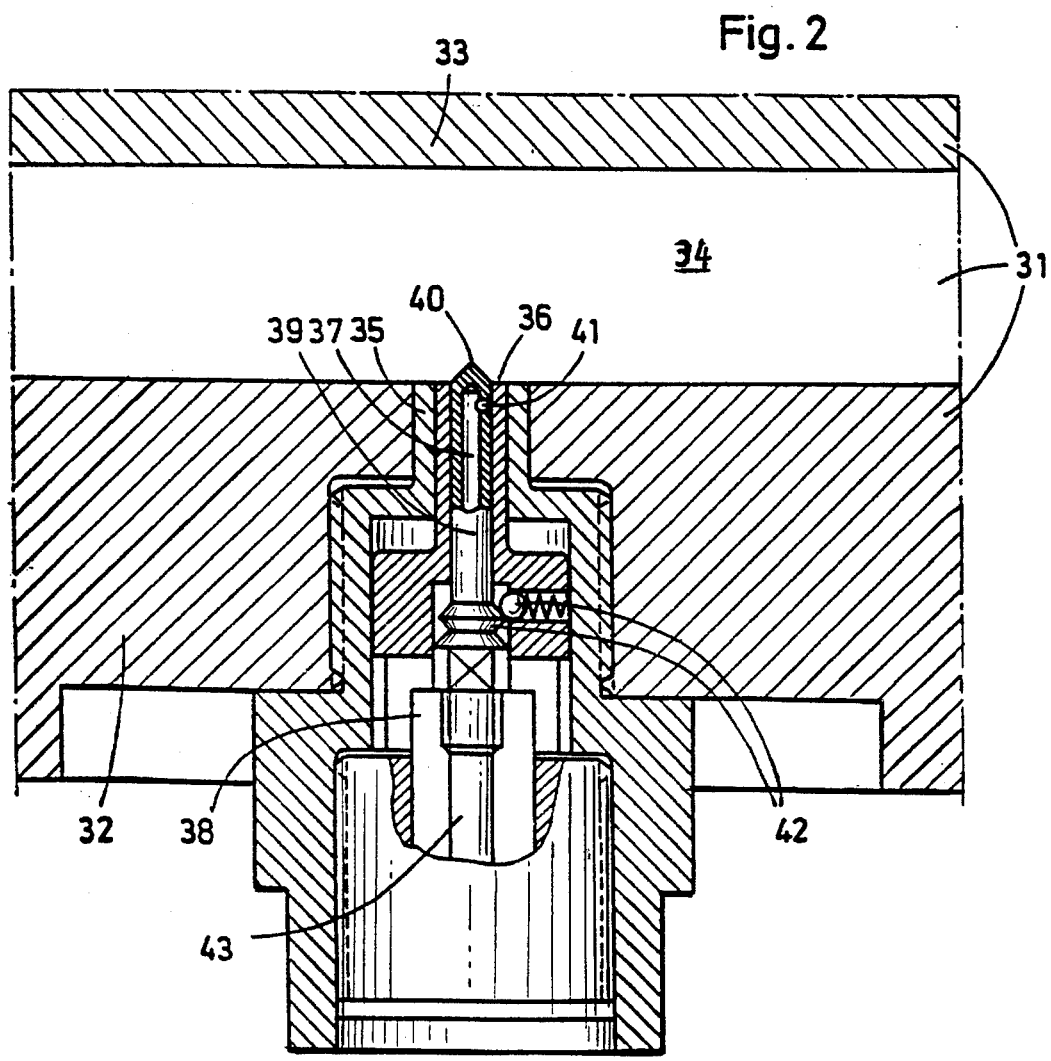
FIG. 2 is a partial longitudinal sectional view of another embodiment of the device for injection molding articles of plastics material having hollow spaces, in which the hollow needle for supplying an additional pressurized medium is mounted so as to be axially slidable to a limited extent relative to the mold cavity of the molding tool.

The molding tool 31 illustrated in FIG. 2 includes two mold halves 32 and 33 which define the mold cavity 34 therebetween. Hollow needle 35 projects flush with the opening end 36 into the mold cavity 34. A needle core 39 is mounted in the hollow needle 35. The needle core 39 has a central gas duct 37 which, in turn, is continuously in connection with a connecting duct 38. The central gas duct 37 is in communication with at least one radial outlet opening 41 provided at a distance from the free end 40 of the needle core 39, wherein the free end 40 has a peak-like or rounded shape.

The needle core 39 is guided within the hollow needle 35 so as to be axially slidable within limits. In the retracted position of the needle core 39 illustrated in FIG. 2, the radial opening 41 is located behind the opening end 36 of the hollow needle 35. However, by advancing the needle core 39 the radial outlet opening 41 can be adjusted in such a way as to be located in the mold cavity 34 in front of the end 36 of the hollow needle 35. The needle core 39 can be fixed in two possible axial positions relative to the hollow needle 35 by means of a locking mechanism 42. The needle core 39 can be moved relative to the hollow needle 35 into two possible axial positions, for example, mechanically, by means of a push rod 43 which acts on the needle core 39.

The diameter of the radial outlet opening 41 is selected so small, for example, less than 0.2 mm, that the opening cannot be clogged with liquid plastics material melt. By retracting the needle core 39 with its outlet opening 41 behind the end 36 of the hollow needle 35, any plastics material melt remaining at this location is stripped off before the melt can finally harden in front of the radial outlet opening 41.

The device for injection molding articles of plastics material with hollow spaces illustrated in FIG. 3 is a further development of the device shown in FIG. 1.

The further development resides in the fact that the hollow needle 5 together with the needle core 9 in the hollow needle 5 are guided in a sleeve member 51 so as to be axially slidable within certain limits, wherein the sleeve member 51 is again mounted stationary in the mold half 2 of a molding tool 1 which includes a mold cavity 4.

The hollow needle 5 and the needle core 9 of FIG. 3 may be essentially of the same construction as those described in connection with FIGS. 1 and 4–7.

However, contrary to the embodiment shown in FIG. 1, the hollow needle 5 of FIG. 3 is at its rearward end connected to an adjusting drive 52, for example, a piston-cylinder unit. A compressed medium, for example, compressed air or compressed oil, may be admitted to the cylinder space 53 of this adjusting drive 52, so that hollow needle 5 and needle core 9 can be pushed together out of the forward end of the sleeve 51 guiding the hollow needle by a certain extent, as illustrated in FIG. 3. After the pressure in the cylinder space 53 is relieved, a restoring spring 54 acts on the piston 55 of the adjusting drive 52 and, thus, the hollow needle 5 and the needle 9 are returned into the sleeve 51 until even the head or plate 10 of the needle core 9 completely disappears in the sleeve member 51.

The axial adjustment of the needle core 9, relative to the hollow needle 5 for the adjustment of the radial gap valve 16, is carried out in the embodiment according to FIG. 5 in the same manner as it is done in the embodiment according to FIG. 1.

In the embodiment of FIG. 3, the connecting duct 8 for supplying the pressurized medium is provided coaxially within the piston 55 of the adjusting drive 52 and is in communication with the hollow needle 5 which is slidable in the sleeve 51 through a sealed plug system 56.

Of course, instead of the simple acting adjusting drive 52 shown in FIG. 3, it is also possible to provide a double-acting adjusting drive in which compressed medium can not only act on the cylinder space 53, but also on the oppositely located cylinder space in which, as shown in FIG. 3, the restoring spring is located.

The arrangement and configuration of an axially displaceable hollow needle 5 shown in FIG. 3 is used in those molding tools in which the plane of separation between the two mold halves does not extend perpendicularly to the longitudinal axis of the hollow needle 5; i.e., in which the finished molded articles must be removed from the opened molding tool 1 essentially transversely of the longitudinal axis of the hollow needle 5.

The plug members of the plug system 56 are connected to each other by means of a screw connection 57 and are connected to the piston 55 of the adjusting drive 52 by means of a screw connection 58 so that it is possible to exchange the hollow needle 5 and the needle core 9 relative to the adjusting drive 52 and the sleeve 51.

The adjusting drive 52 is releaseably and exchangeably connected to the mold half 2 and the sleeve 51 serving for guiding the hollow needle 5 is replaceably mounted in this mold half 2.

The above-described embodiments of a device for injection molding articles of plastics material having hollow spaces in a molding tool have the additional particular advantage compared to all previously known devices of similar types that the medium introduced into the center of the articles for forming the hollow spaces can be drawn off by means of the hollow needle prior to removing the articles from the mold, and thus, the medium can be recovered almost completely.

The device according to FIG. 3 has the further advantage that the needle 5 can be advanced into the mold cavity 4 either immediately prior to or during the injection phase of the liquid plastics material melt. After the plastics material melt has passed the hollow needle 5, the additional pressurized medium, for example, gas, is introduced through the narrow gap 16 at a previously determined moment. The medium now has to fill and build up the pressure in the mold cavity, wherein the pressure of the medium is maintained throughout the filling time of the plastics material melt, so that the pressure of the medium acts as an afterpressure. After the pressure period of the medium is concluded, the pressure is relieved through the hollow needle which still is advanced into the mold cavity by conducting the medium out of the mold cavity and, thus, almost completely recovering the medium.

While specific embodiments of the invention have been shown and described in detail to illustrate the inventive principles, it will be understood that the invention may be embodied otherwise without departing from such principles.

We claim:

1. A device for injection molding of articles of plastics material having hollow spaces, comprising:
   a molding tool having a mold cavity for receiving the plastics material and an opening for introducing a low viscosity plastic material melt into said mold cavity;
   means for introducing a pressurized medium into said mold cavity, said introducing means comprising:
   a hollow needle for extending into the mold cavity, at a location spaced from the introducing opening and having a free end thereof washed with the plastic material melt;
   a needle core mounted within the hollow needle, and defining therewith a variable size outlet aperture at the free end of said hollow needle for introducing the pressurized medium into said mold cavity;
   means for displacing said needle core and said hollow needle relative to each other for varying the size of the variable size outlet aperture; and
   a body having a first length portion extending from the free end of the hollow needle and an inner diameter along the first length portion corresponding to the outer diameter of the needle core, so that the hollow needle and the needle core have sliding contact along the first length portion;
   said body having a second length portion extending from an end of the first length portion remote from the free end of the hollow needle and having a second inner diameter selected such that a radial gap is maintained between the hollow needle and the outer diameter of the needle core, the needle core having a core body which extends from its free end to the second length portion of the hollow needle and has, on an outer surface thereof, at least one longitudinally extending recess for conducting the pressurized medium from the radial gap to the variable size opening.

2. The device according to claim 1, wherein the longitudinally extending recess is a groove.

3. The device according to claim 1, wherein the longitudinally extending recess is a diametrical slot.

4. A device for injection molding of articles of plastics material having hollow spaces, comprising:
   a molding tool having a mold cavity for receiving the plastics material and an opening for introducing a low viscosity plastic material melt into said mold cavity;
   means for introducing a pressurized medium into said mold cavity, said introducing means comprising:
   a hollow needle for extending into the mold cavity, at a location spaced from the introducing opening and having a free end thereof washed with the plastic material melt;
   a needle core mounted within the hollow needle, and defining therewith a variable size outlet aperture at the free end of said hollow needle for introducing the pressurized medium into said mold cavity;
   means for displacing said needle core and said hollow needle relative to each other for varying the size of the variable size outlet aperture; and
   a body having a first length portion extending from the free end of the hollow needle and an inner diameter along the first length portion corresponding to the outer diameter of the needle core, so that the hollow needle and the needle core have sliding contact along the first length portion;
   said body having a second length portion extending from an end of the first length portion remote from the free end of the hollow needle and having a second inner diameter selected such that a radial gap is maintained between the hollow needle and the outer diameter of the needle core, the needle core having a core body which extends from its free end to the second length portion of the hollow needle and has, on an outer surface thereof, at least one circumferential flattened portion for conducting the pressurized medium from the radial gap to the variable size opening.

5. A device for injection molding of articles of plastics material having hollow spaces, comprising:
   a molding tool having a mold cavity for receiving the plastics material and an opening for introducing a low viscosity plastic material melt into said mold cavity;
   means for introducing a pressurized medium into said mold cavity, said introducing means comprising:
   a hollow needle for extending into the mold cavity, at a location spaced from the introducing opening and having a free end thereof washed with the plastic material melt;
   a needle core mounted within the hollow needle, and defining therewith a variable size outlet aperture at the free end of said hollow needle for introducing the pressurized medium into said mold cavity; and
   means for displacing said needle core and said hollow needle relative to each other for varying the size of the variable size outlet aperture;
   wherein the needle core has a free end;
   wherein the free end of the needle core and the free end of the hollow needle define a radially directed gap-type valve when the needle core is maintained at a predetermined axial position within the hollow needle, the gap-type valve having a gap width of less than 0.2 mm; and
   wherein the free end of the needle core has a head having an outer diameter which at least approximately equals the outer diameter of the hollow needle, a free end, and a peak-shaped portion mounted on the free end of the head.

6. A device for injection molding of articles of plastics material having hollow spaces, comprising:

a molding tool having a mold cavity for receiving the plastics material and an opening for introducing a low viscosity plastic material melt into said mold cavity;

means for introducing a pressurized medium into said mold cavity, said introducing means comprising:

a hollow needle for extending into the mold cavity, at a location spaced from the introducing opening and having a free end thereof washed with the plastic material melt;

a needle core mounted within the hollow needle, and defining therewith a variable size outlet aperture at the free end of said hollow needle for introducing the pressurized medium into said mold cavity; and means for displacing said needle core and said hollow needle relative to each other for varying the size of the variable size outlet aperture;

wherein the needle core comprises a central gas duct, a free end, and one radial outlet defined by the needle core, wherein the radial outlet opening is spaced from the free end of the needle core, wherein the hollow needle has an end, the radial outlet opening being axially displaceable relative to the end of the hollow needle, and wherein the free end of the needle core has a peak-shaped portion.

* * * * *